United States Patent
Kobayashi

(10) Patent No.: US 10,907,717 B2
(45) Date of Patent: Feb. 2, 2021

(54) WAVE GENERATOR AND STRAIN WAVE GEARING

(71) Applicant: HARMONIC DRIVE SYSTEMS INC., Tokyo (JP)

(72) Inventor: Masaru Kobayashi, Azumino (JP)

(73) Assignee: Harmonic Drive Systems Inc., Tokyo (JP)

( * ) Notice: Subject to any disclaimer, the term of this patent is extended or adjusted under 35 U.S.C. 154(b) by 150 days.

(21) Appl. No.: 16/316,461

(22) PCT Filed: Jul. 30, 2016

(86) PCT No.: PCT/JP2016/072456
§ 371 (c)(1),
(2) Date: Jan. 9, 2019

(87) PCT Pub. No.: WO2018/025296
PCT Pub. Date: Feb. 8, 2018

(65) Prior Publication Data
US 2019/0234502 A1    Aug. 1, 2019

(51) Int. Cl.
*F16H 1/32* (2006.01)
*F16H 49/00* (2006.01)
(Continued)

(52) U.S. Cl.
CPC .......... *F16H 49/001* (2013.01); *F16C 19/16* (2013.01); *F16H 1/32* (2013.01); *F16C 33/3806* (2013.01); *F16C 2361/61* (2013.01)

(58) Field of Classification Search
CPC ........ F16H 49/001; F16C 19/16; F16C 33/38; F16C 33/3806
(Continued)

(56) References Cited

U.S. PATENT DOCUMENTS

| 7,484,436 B2 * | 2/2009 | Kiyosawa | F16C 19/52 |
| | | | 184/6.12 |
| 2015/0240928 A1 * | 8/2015 | Jones | F16C 33/585 |
| | | | 74/413 |

FOREIGN PATENT DOCUMENTS

| JP | H06300045 A | 10/1994 |
| JP | 2007177993 A | 7/2007 |

(Continued)

OTHER PUBLICATIONS

International Search Report (PCT/ISA/210) dated Sep. 13, 2016, by the Japanese Patent Office as the International Searching Authority for International Application No. PCT/JP2016/072456.

(Continued)

*Primary Examiner* — William C Joyce
(74) *Attorney, Agent, or Firm* — Buchanan Ingersoll & Rooney PC

(57) ABSTRACT

A wave generator of a strain wave gearing is provided with a rigid plug, a wave bearing mounted to the ellipsoidal outer peripheral surface of the rigid plug, and four elastic claws that rotate integrally with the rigid plug. The balls of the wave bearing include balls in a loose state and balls in a tight state. The loose-state balls adjacent to the tight-state balls are applied with braking force by the elastic claws immediately before they transition into a tight state, and the orbital motion thereof is temporarily prevented or suppressed, whereby the gaps between the loose-state balls and the adjacent tight-state balls are secured. It is possible to prevent increase in rotational torque, damage to the balls or other defects due to ball-to-ball contact by the tight-state balls.

10 Claims, 6 Drawing Sheets

(51) Int. Cl.
*F16C 19/16* (2006.01)
*F16C 33/38* (2006.01)

(58) Field of Classification Search
USPC .......................................................... 74/640
See application file for complete search history.

(56) References Cited

FOREIGN PATENT DOCUMENTS

| | | |
|---|---|---|
| WO | 2005100818 A1 | 10/2005 |
| WO | 2010140656 A1 | 12/2010 |

OTHER PUBLICATIONS

Written Opinion (PCT/ISA/237) dated Sep. 13, 2016, by the Japanese Patent Office as the International Searching Authority for International Application No. PCT/JP2016/072456.

\* cited by examiner

WAVE GENERATOR AND STRAIN WAVE GEARING

TECHNICAL FIELD

The present invention relates to a wave generator of a strain wave gearing, and in particular to a wave generator provided with a wave bearing having no retainer.

BACKGROUND ART

A strain wave gearing is generally provided with a rigid internally toothed gear, a flexible externally toothed gear disposed coaxially inside the internally toothed gear, and a wave generator disposed inside the externally toothed gear. The wave generator is provided with a rigid plug having an ellipsoidal outer peripheral surface, and a wave bearing mounted to the ellipsoidal peripheral surface of the rigid plug. The wave bearing has a flexible outer race and a flexible inner race, these outer and inner races are flexed into an ellipsoidal shape by the rigid plug, and balls are inserted rotatably between the races in a flexed state.

A typical wave bearing of a strain wave gearing is provided with a retainer to maintain balls at fixed intervals. This causes rotational torque of the wave bearing to increase due to sliding between the balls and the walls of the retainer, sliding between the outer peripheral surface of the retainer and the inner peripheral surface of the outer race and sliding between the inner peripheral surface of the retainer and the outer peripheral surface of the inner race. In addition, since the retainer is provided, the number of balls is also limited. In a case in which a wave bearing is rotated in a state of full complement by simply increasing the number of balls without using a retainer, there is a risk that rotational torque thereof increases due to offset of balls and sliding between the balls, depending on the orientation and rotational conditions of the wave bearing. There is also a risk that the balls are damaged due to sliding at high speed between the balls.

In a conventional annular rolling bearing, methods for ensuring gaps between rolling elements are disclosed in Patent documents 1 and 2. In a method disclosed in Patent document 1, the shape of a raceway groove is set so as to change points where balls come into contact with the raceway surface. In a method disclosed in Patent document 2, each ball is magnetized and the gaps between the balls are ensured by making use of magnetic repulsive force between the balls.

CITATION LIST

Patent Document

Patent document 1: JP 2007-177993 A
Patent document 2: JP H06-300045 A

SUMMARY OF INVENTION

Technical Problem

In a wave generator of a strain wave gearing, a wave bearing is flexed into an ellipsoidal shape by an ellipsoidal rigid plug, and conditions of load applied to rolling elements are changed at respective positions in the circumferential direction. Specifically, in a wave bearing that is flexed into an ellipsoidal shape, the flexible inner and outer races thereof are forced to flex outward in the radial direction at both ends in the major axis direction of the ellipsoidal shape by the rigid plug. The rolling elements are therefore sandwiched between the flexible inner and outer races in a tight state. In contrast, the space between the flexible races is large at both ends in the minor axis direction of the ellipsoidal shape, and the rolling elements are sandwiched between the races in a loose state in which a gap is formed between the rolling elements and the raceway surfaces of the inner and outer races.

In view of the change in conditions of load applied to the rolling elements of a wave bearing, an object of the present invention is to provide a wave generator of a strain wave gearing, which is able to secure gaps between tight-state rolling elements without a retainer.

Solution to Problem

In order to solve the above problems, a wave generator of a strain wave gearing according to the present invention is provided with:

a rigid plug having a non-circular outer peripheral surface or a non-circular inner peripheral surface;

a wave bearing capable of being flexed radially, the wave bearing being mounted to the non-circular outer peripheral surface or the non-circular inner peripheral surface and being flexed into a non-circular shape;

a gap securing member that rotates integrally with the rigid plug, wherein the wave bearing is provided with:

an inner race-side raceway surface and an outer race-side raceway surface that are flexed into a non-circular shape by the rigid plug; and a plurality of rolling elements inserted between the inner race-side raceway surface and the outer race-side raceway surface, part of the rolling elements being in a loose state and the remaining rolling elements being in a tight state, and wherein, where one pair of adjacent rolling elements among the rolling elements, are referred to as a first rolling element and a second rolling element, the first rolling element being in the loose state and the second rolling element being in the tight state, the gap securing member is a member for applying a braking force to the first rolling element against an orbital motion thereof in a direction toward the second rolling element, to ensure a gap between the first rolling element and the second rolling element.

As the gap securing member, an elastic member can be employed, in which the elastic member is disposed in a state capable of being in contact with the first rolling element and applies an elastic force as the braking force. Alternatively, a magnet can be employed as the gap securing member, in which the magnet is disposed in a state capable of facing the first rolling element and applies a magnetic attraction force as the braking force.

In an example, the rigid plug has a non-circular outer peripheral surface which is an ellipsoidal outer peripheral surface, and first to fourth gap securing members are provided as the gap securing member, the first to fourth gap securing member being attached to the outer peripheral edge part of the rigid plug. In this case, the first and second gap securing members are attached at symmetrical angular positions less than 45 degrees from the major axis of the ellipsoidal shape. The third and fourth gap securing members are also attached at symmetrical angular positions less than 45 degrees from the major axis of the ellipsoidal shape, in which the symmetrical angular positions are symmetrical with those of the first and second gap securing members with respect to the minor axis of the ellipsoidal shape.

In a wave bearing flexed into a non-circular shape, for example, an ellipsoidal shape, the position of the major axis (minor axis) of the rigid plug determines the positions where tight-state rolling members with load being applied are located and those where loose-state rolling members without load being applied are located. Specifically, the rolling elements become a tight state on and in the vicinity of the major axis of the ellipsoidal shape and become a loose state on and in the vicinity of the minor axis thereof.

In the present invention, immediately before a rolling element transitions from a loose state into a tight state, a gap between this rolling element and the adjacent rolling element which has already being in a tight state is secured by using the gap securing member integrally rotating with the rigid plug. These rolling members revolve with maintaining the gap during they are in a tight state. For example, in a case in which the rigid plug has an outer peripheral surface of an ellipsoidal shape, the gaps between the rolling elements are ensured by first to fourth gap securing members at four locations on the outer peripheral surface of the rigid plug directly before the rolling members transition from a loose state into a tight state, whereby it is possible to prevent the rolling elements in a tight state from contacting with each other.

According to the present invention, the gap securing member integrally rotating with the rigid plug is used to ensure gaps between the rolling elements in a tight state and being applied with load. Accordingly, a retainer is not required to maintain gaps between the rolling elements in a tight state, and it is possible for the wave gearing to be a bearing of full complement ball type or of full complement roller type. It is also possible to prevent or suppress increase in rotational torque due to offset of rolling elements and sliding between the rolling elements, and damages due to sliding between the rolling elements in a tight state when the wave bearing is a bearing of full complement ball type or full complement roller type.

MODE FOR CARRYING OUT THE INVENTION

Figure 1:
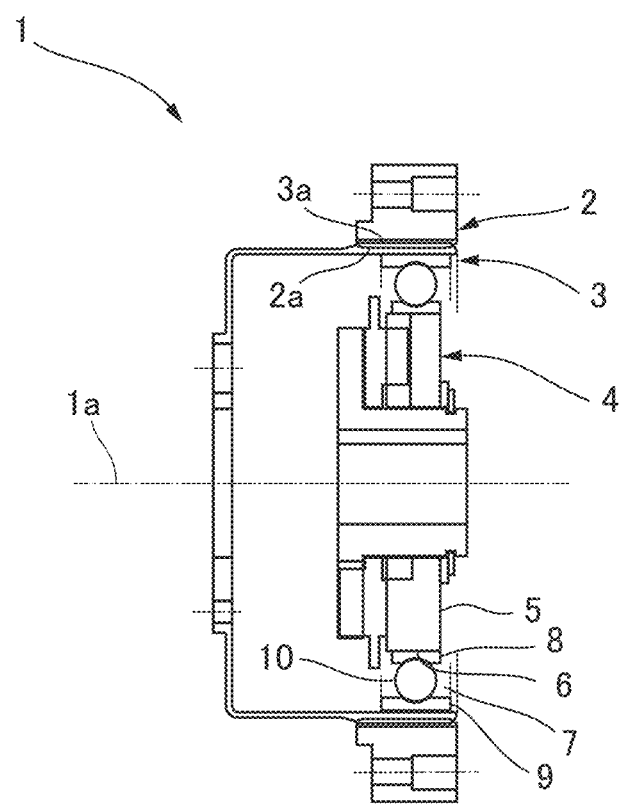
FIG. 1 is a longitudinal cross-sectional view illustrating a strain wave gearing according to the present invention.
Figure 2:
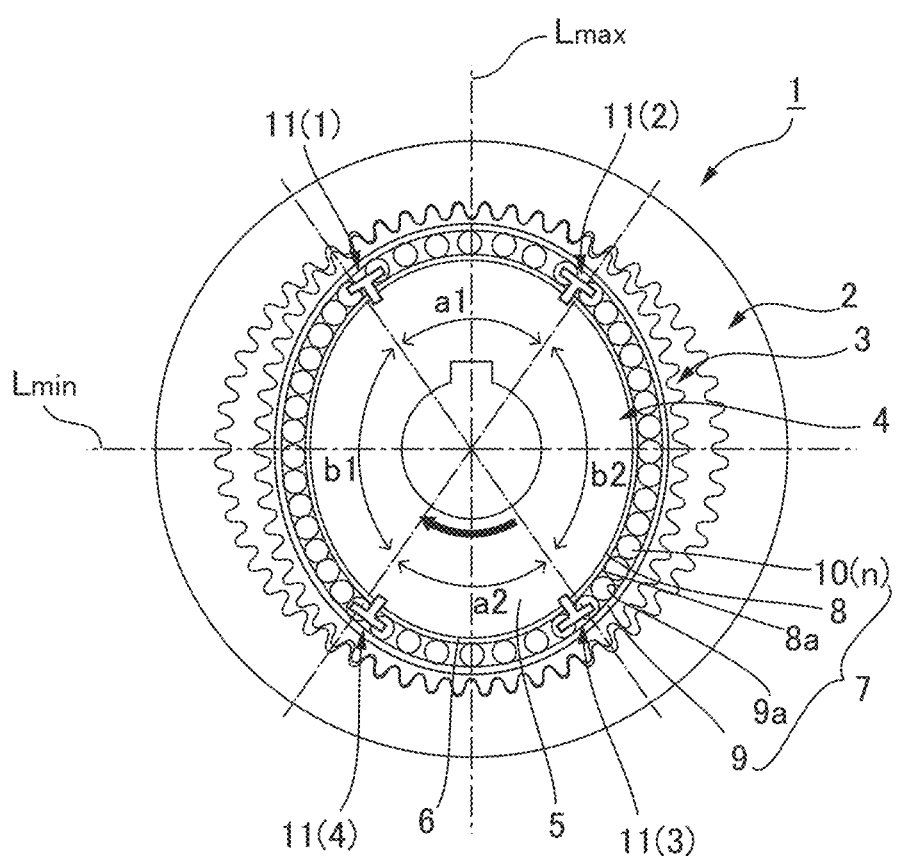
FIG. 2 is an explanatory view illustrating a meshing state in the strain wave gearing.

With reference to the drawings, an embodiment of a strain wave gearing according to the present invention will be described. FIG. 1 is a longitudinal cross-sectional view of a strain wave gearing according to the present embodiment, and FIG. 2 is a schematic view illustrating a meshing state in the strain wave gearing.

The strain wave gearing 1 is provided with a rigid internally toothed gear 2, a cup-type flexible externally toothed gear 3 disposed inside the internally toothed gear, and an ellipsoidal contoured wave generator 4 fitted into the externally toothed gear. The externally toothed gear 3 of a circular shape has a portion where external teeth 3a are formed, the portion being flexed into an ellipsoidal shape by the wave generator 4. Among the external teeth 3a, those located on the both end in the direction of the major axis Lmax of the ellipsoidal shape are meshed with internal teeth 2a of the circular internally toothed gear 2.

The wave generator 4 is connected to a motor shaft or other high-speed rotation input shaft. When the wave generator 4 rotates, the meshing positions between the both gears 2 and 3 move in the circumferential direction to generate relative rotation between the both gears 2 and 3 due to the difference in the number of teeth therebetween. For example, the internally toothed gear 2 is fixed not to rotate and the externally toothed gear 3 is connected to the load-side member, whereby reduced-speed rotation is outputted from the externally toothed gear 3 and is transferred to the load-side member.

The wave generator 4 is provided with a rigid plug 5 having a prescribed thickness and a wave bearing 7 mounted to an ellipsoidal outer peripheral surface 6 of the rigid plug 5. The wave bearing 7 is of a full-complement ball type and is provided with a circular inner race flexible in a radial direction, a circular outer race flexible in a radial direction, and a plurality of balls $10(n)$ (n=1, 2, 3, ...) accommodated rotatably between the races. In the following, the balls $10(n)$ are collectively referred to as balls 10.

The wave bearing 7 is fitted into the externally toothed gear 3 in a state being flexed into an ellipsoidal shape by the rigid plug 5. The wave bearing maintains the externally toothed gear 3 and the rigid plug 5 connected to the high-speed rotation input shaft in a relatively rotatable state. Specifically, the balls 10 inserted between the ellipsoidally-flexed inner and outer races 8 and 9 perform rolling motion along the inner race-side raceway surface 8a of the inner race 8 and the outer race-side raceway surface 9a of the outer race 9, whereby it is possible for the rigid plug 5 and the externally toothed gear 3 to rotate relatively with small torque.

Among the balls 10, one or plural balls located on or in the vicinity of the major axis Lmax of the ellipsoidal shape are a tight ball sandwiched between the inner and outer races 8 and 9 in a tight state in which the tight ball performs a rolling motion in point contact with the inner race-side raceway surface 8a and the outer race-side raceway surface 9a. The remaining balls located at positions apart from the major axis Lmax are a loose ball held between the inner and outer races 8 and 9 in a loose state. In the loose state, the loose ball performs rolling motion freely with gaps being formed between the ball and the inner race 8 and between the ball and the outer race 9. For example, in FIG. 2, the balls 10 within the angular ranges a1 and a2 about the center axis line 1a are a tight ball, and the balls 10 within the angular ranges b1 and b2 are a loose ball.

Four elastic claws 11(1) to 11(4) are attached to the outer peripheral edge portion of the outer peripheral surface 6 of the rigid plug 5 so that a gap is ensured between the adjacent tight balls located within the angular ranges a1 and a2. Each of the elastic claws 11 (1) to 11(4) is disposed so as to locate between a loose ball and a tight ball adjacent to the loose ball. Specifically, the elastic claws 11(1) and 11(2) are disposed on one side along the major axis Lmax of the ellipsoidal outer peripheral surface 6 and are located symmetrically with each other with respect to the major axis Lmax. The elastic claws 11(3) and 11(4) are disposed on the other side along the major axis of the ellipsoidal peripheral surface 6 and are located symmetrically with each other with respect to the major axis Lmax. In addition, the elastic claws 11(1) and 11(2) are disposed symmetrically with the elastic claws 11(3) and 11(4) with respect to the minor axis Lmin of the ellipsoidal outer peripheral surface 6.

For example, when viewed along the direction of the center axis line 1a (device axis line) of the rigid plug 5, the elastic claws 11(1) to 11(4) are disposed at angular positions within less than 45 degrees left and right from the major axis line Lmax along the outer peripheral surface 6, and within approximately 35 degrees in the example of FIG. 2. The elastic claws 11(1) to 11(4) are an identical component part and are therefore referred to collectively as an elastic claw 11.

Figure 3A:
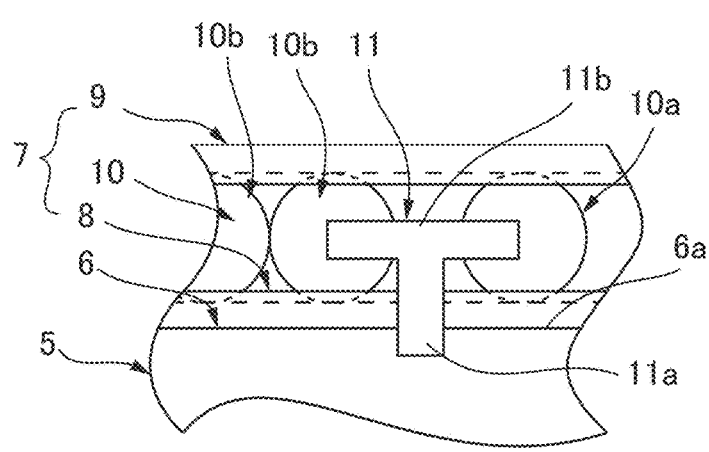
FIGS. 3(a)-3(c) include a front view, a plan view and a side view, illustrating a gap securing member.
Figure 3C:
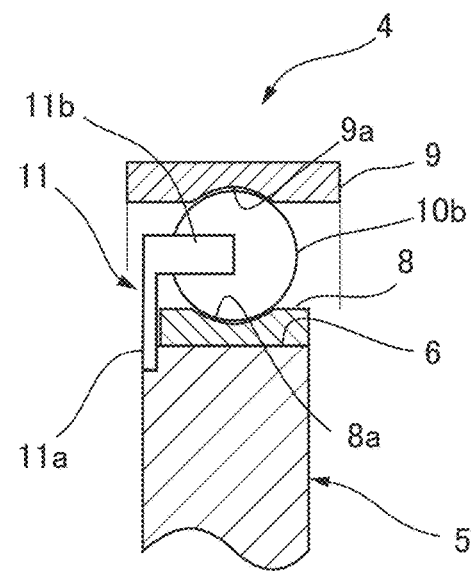
Figure 3B:
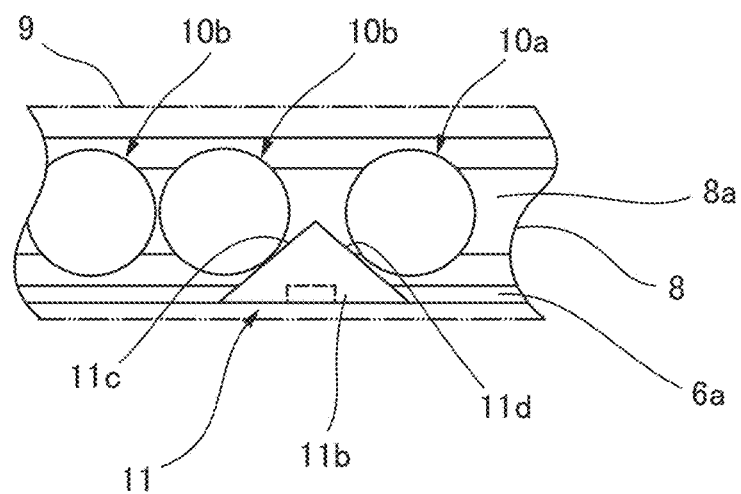

FIG. 3 (a) is a front view of the elastic claw 11 when viewed along the direction of center axis line 1a (see FIG. 1) of the wave generator 4. FIG. 3(b) is a plan view of the elastic claw 11 when viewed from the outer peripheral side in the radial direction. FIG. 3(c) is a side view of the elastic claw 11 when viewed along the direction of orbital motion of the balls 10.

As illustrated in these drawings, the elastic claw 11 is provided with a plate-like lower portion 11a and an upper portion having a flat triangular prism shape. The lower portion 11a has a lower end fixed to a portion (outer peripheral edge portion) of the rigid plug 5 where the outer peripheral surface 6 is formed, the portion being located laterally to the inner race 8. The elastic claw 11 is disposed so that the upper portion 11b thereof is in a state entering between the adjacent loose-state ball 10b and tight-state ball 10a. The upper portion 11b has a pair of inclined surfaces 11c and 11d intersecting at an obtuse angle, and the inclined surfaces are surfaces capable of being in point contact with a tight-state ball 10a and with a loose-state ball 10b.

The upper portion 11b of the elastic claw 11 is capable of being elastically deformed, when pushed by the tight-state ball 10a, from a projecting position in which the upper portion enters between the balls as shown by solid lines in FIG. 3(b) to a retreat position in which the upper portion is pushed out laterally. In other words, the elastic claw 11 has a shape and an elastic characteristic so as not to prevent the orbital motion of the tight-state ball 10a. The shape of the elastic claw 11 illustrated in the drawings is an example, and the elastic claw can be of another cross-sectional shape.

Figure 4A:
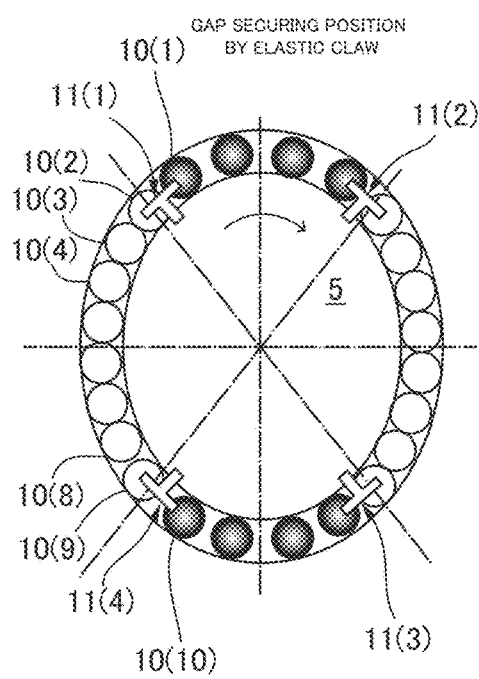
FIGS. 4(a) and 4(b) include explanatory views illustrating operations in which gaps between balls are secured by gap securing members.
Figure 4B:
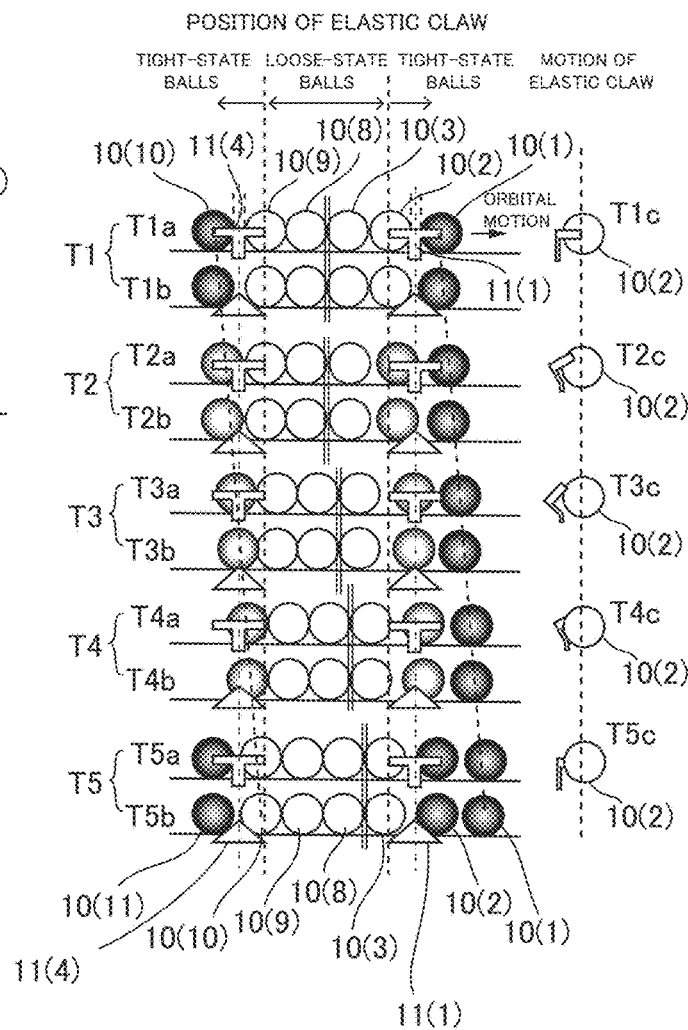

FIG. 4(a) is an explanatory view illustrating a positional relationship at some point in time between the rigid plug 5 and the elastic claws 11(1) to 11(4), and the balls 10. FIG. 4(b) is an explanatory view illustrating changes in positional relationship between the elastic claws 11(1), 11(4) and the balls 10 in accordance with the rotation of the rigid plug 5, in which the change in relative position of the balls 10 is illustrated when the elastic claws 11(1) and 11(4) are regarded as stationary side. More specifically, at respective points of time T1 to T5 in FIG. 4(b), T1a to T5a are explanatory views illustrating the positional relationship between the elastic claws 11(1), 11(4) and the balls 10 when developed on a straight line, T1b to T5b are explanatory views illustrating the positional relationship therebetween when viewed from outward in the radial direction, and T1c to T5c are explanatory views illustrating the elastic deformation of the elastic claws 11(1), 11(4) when viewed along the direction of orbital motion of the balls 10.

Referring to these drawings, an operation performed by the elastic claw 11(1) for securing a gap between the balls 10 in a tight state will be explained. At point in time T1 of FIG. 4(b), the elastic claw 11(1) is in the projecting position in which the elastic claw 11(1) enters between a ball 10(2) in a loose state and a ball 10(1) which is in a tight state and is adjacent to the ball 10(2). The inclined surfaces 11c and 11d of the elastic claw 11(1) are respectively in contact with the adjacent balls 10(2) and 10(3).

When the rigid plug 5 rotates in the direction shown by arrow in FIG. 4 (a), the elastic claws 11(1) and 11(4) rotate integrally with the plug. Because the balls 10 perform orbital motion at a speed that is lower than the rotational speed of the elastic claws 11(1) and 11(4) in the same direction, the elastic claws 11(1) and 11(4) rotate while getting over the side surface portions of the respective balls 10 and are subjected to repeated elastic deformations between the projecting position and the retreat position. When the elastic claws 11(1) and 11(4) are regarded as stationary side, the respective balls 10 perform orbital motion while pushing the elastic claws 11(1) and 11(4) out to the retreat position successively.

More specifically, at point in time T1, the ball 10(2) in a loose state is applied with a braking force by the elastic claw 11(1), whereby the orbital motion of the ball 10(2) is temporarily prevented. On the other hand, the adjacent ball 10(1) in a tight state is not prevented in its orbital motion, and therefore a prescribed gap is obtained between the ball 10(2) in a loose state and the ball 10(1) in a tight state.

The relative positional relationship between the elastic claws 11(1), 11(4) and the balls 10(2), 10(1) transitions from point in time T1 to point in time T2 in FIG. 4(b). Point in time T2 is the point in time at which the ball 10(2) in a loose state and adjacent to the ball 10(1) in a tight state is on the way of transition to a tight state.

During transitioning to a tight state, the force of orbital motion also increases to such an extent that that the elastic claw 11(1) can be elastically deformed by the ball. Thus, the ball 10(2) shifts into a tight state while pushing the elastic claw 11(1) out to the retreat position from the projecting position as illustrated in point in time T2 through point in time T5. The balls 10(1) and 10(2) in a tight state move until the state of these balls is shifted from a tight state back to a loose state while maintaining the gap between them.

The elastic claw 11(1) elastically returns back to the projecting position after the ball 10(2) has passed through as illustrated at point of time T5, and enters between the ball 10(2) which has been in a tight state and the next ball 10(3) in a loose state.

On the other hand, the other elastic claw 11(4) is in a state entering between the ball 10(9) in a loose state and the ball 10 (10) in a tight state at point in time T1. The ball 10(10) in a tight state transitions to a loose state while pushing the elastic claw 11(4) out to the retreat position in accordance with the rotation of the rigid plug 5. At point in time T5 when the ball 10(10) gets over the elastic claw 11(4) to become in a loose state, the elastic claw 11(4) elastically returns to the projecting position and enters between the ball 10(10) in a loose state and the next ball 10(11) in a tight state. When the rigid plug 5 rotates in the opposite direction, the elastic claw 11(4) functions to secure a gap between the loose-state ball 10b transitioning from a loose state to a tight state and the tight-state ball 10a adjacent to the loose-state ball.

The remaining elastic claws 11(2) and 11(3) perform the similar operations. When the rigid plug 5 rotates in the direction as shown by arrow in FIG. 4(a), the gap is obtained by the elastic claw 11(3) between a ball 10 which is in a loose state and transitions from a loose state to a tight state and an adjacent ball 10 which is in a tight state. When the rigid plug rotates in the opposite direction, the elastic claw 11(2) functions to secure a gap between a ball 10 which is in a loose state and transitions to a tight state and an adjacent ball 10 which is in a tight state.

(Another Example of Gap Securing Member)

The elastic claw 11 is employed as the gap securing member in the above-mentioned embodiment. It is also possible as the gap securing member to employ a magnet.

Figures 5A, 5B:
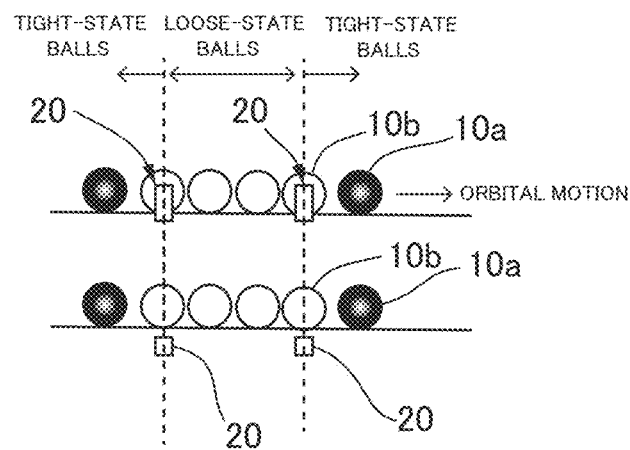
FIGS. 5(a) and 5(b) include explanatory views in a case in which magnets are used as the gap securing member.

FIG. 5 includes explanatory views of a case in which a magnet is used as the gap securing member and the balls 10 of the wave bearing are illustrated in a state developed on a straight line as in FIG. 4(b). FIG. 5(a) is an explanatory view when viewed along the center axis line of the wave bearing, and FIG. 5(b) is an explanatory view when viewed from the outer peripheral side of the wave bearing.

As illustrated in these drawings, magnets 20, which integrally rotate with the rigid plug (not shown), are disposed. Each magnet 20 is disposed at a position facing a loose-state ball 10b from a lateral direction, the loose-state ball being adjacent to a tight-state ball 10a. The balls 10a and 10b are a magnetic body, and the orbital motion of the ball 10b passing through the side of the magnet 20 is temporarily prevented or suppressed by magnetic attraction force. In this way, a gap to the adjacent tight-state ball 10a can be obtained directly before the loose-state ball 10b transitions to a tight state.

(Strain Wave Gearing in Another Type)

The above-mentioned embodiment is an example in which the present invention is applied to a cup-type strain wave gearing provided with a cup-shaped externally toothed gear. The present invention can also be applied to a top-hat-type strain wave gearing provided with a top-hat-shaped externally toothed gear and a flat-type strain wave gearing provided with a cylindrical externally toothed gear.

In addition, the above-mentioned embodiment is an example in which the present invention is applied to a strain wave gearing provided with a rigid internally toothed gear and a flexible externally toothed gear disposed inside the internally toothed gear. The present invention can also be applied to a strain wave gearing configured so that a flexible internally toothed gear 32 is disposed to surround a rigid externally toothed gear 31 and a wave generator 33 is disposed to surround the internally toothed gear 32. In this case, the wave generator 33 is provided with a rigid plug 34 and a wave bearing 35 mounted between the non-circular inner peripheral surface of the rigid plug 34 and the internally toothed gear 32. In this case, gap securing members can be attached, for example, to prescribed positions of the rigid plug 34 along the circumferential direction thereof.

(Another Shape of Wave Generator)

In the above-mentioned embodiment, the rigid plug of the wave generator has an ellipsoidal outer peripheral surface as a non-circular outer peripheral surface. As the shape of the outer peripheral surface, a non-circular shape other than an ellipsoidal shape can be employed.

Figure 6A:
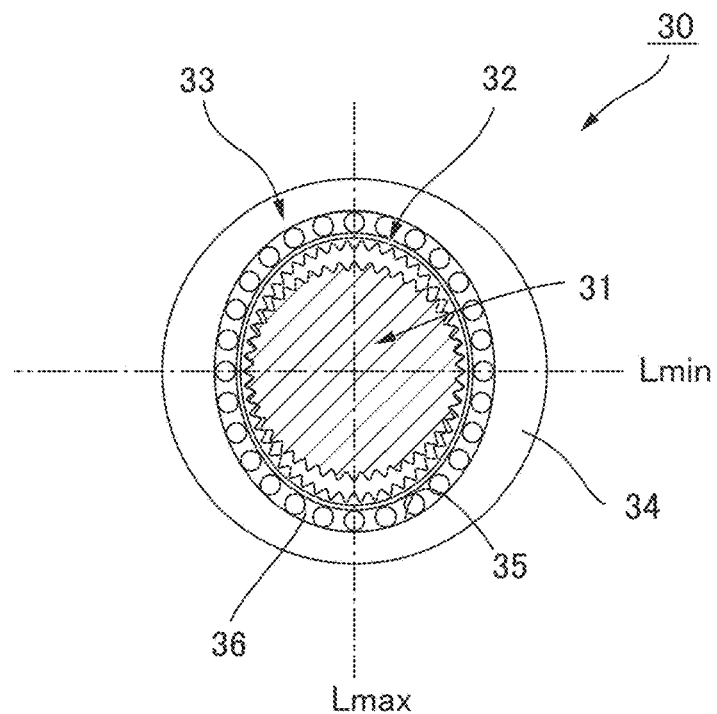
FIGS. 6(a) and 6(b) include explanatory views illustrating strain wave gearings to which the present invention can be applied.
Figure 6B:
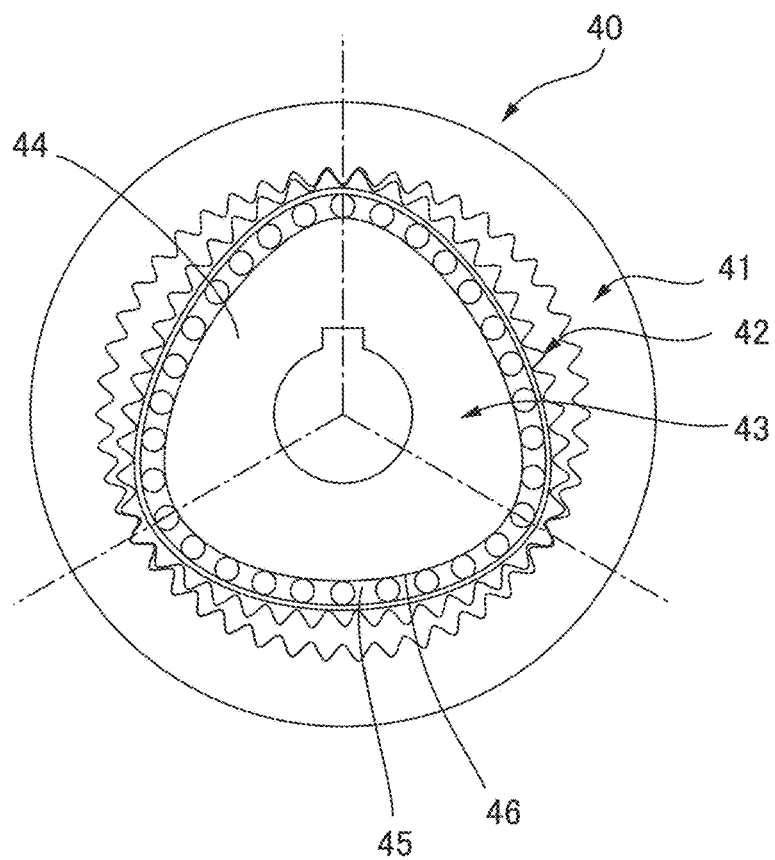

For example, it is possible to use a rigid plug provided with an outer peripheral surface having a three-lobe shape. In a strain wave gearing 40 with this configuration, a flexible gear 42 meshes with a rigid gear 41 at three positions in the circumferential direction, as illustrated in FIG. 6(b). Therefore, in a wave bearing 45 of a wave generator 43, when viewed along the non-circular outer peripheral surface 46 of the rigid plug 44, rolling elements located at the three positions where the gears are meshed with each other, are in a tight state, while the remaining rolling elements located between the three positions where the rolling elements are in a tight state, are in a loose state. The rolling elements in a tight state and those in a loose state are located adjacent to each other at six locations, and therefore a gap securing member is disposed at these six locations.

(Wave Bearing)

In the above-mentioned embodiment, the wave bearing of the wave generator is provided with an inner race fitted on the ellipsoidal outer peripheral surface of the rigid plug. As like as the wave bearings 35 and 45 in FIG. 6, it is possible that an inner race or an outer race be omitted, and instead an inner race-side raceway surface or an outer race-side raceway surface be formed directly on the non-circular outer peripheral surface or the non-circular inner peripheral surface of a rigid plug.

In the above-mentioned embodiment, a ball bearing is used as the wave bearing. It is possible for the wave bearing to be provided with rolling elements other than balls. For example, a roller bearing can be used as the wave bearing. In this case, rollers having planar end faces and those having round end faces, either can be employed. When the rollers having round end faces are employed, elastic claws can be used as a gap securing member in addition to the above-mentioned magnets.

The invention claimed is:

1. A wave generator of a strain wave gearing comprising:
   a rigid plug having a non-circular outer peripheral surface or a non-circular inner peripheral surface;
   a wave bearing capable of being flexed radially, the wave bearing being mounted to the non-circular outer peripheral surface or the non-circular inner peripheral surface and being flexed into a non-circular shape; and
   a gap securing member that rotates integrally with the rigid plug,
   wherein the wave bearing comprises:
      an inner race-side raceway surface and an outer race-side raceway surface that are flexed into a non-circular shape by the rigid plug; and
      a plurality of rolling elements inserted between the inner race-side raceway surface and the outer race-side raceway surface, part of the rolling elements being in a loose state and the remaining rolling elements being in a tight state, and
   wherein,
   where one pair of adjacent rolling elements among the rolling elements, are referred to as a first rolling element and a second rolling element, the first rolling element being in the loose state and the second rolling element being in the tight state,
   the gap securing member is a member for applying a braking force to the first rolling element against an orbital motion thereof in a direction toward the second rolling element, to secure a gap between the first rolling element and the second rolling element, and
   wherein the gap securing member is a magnet that is disposed in a state capable of facing the first rolling element and applies a magnetic attraction force as the braking force.

2. A strain wave gearing comprising:
   a rigid gear;
   a flexible gear capable of meshing with the rigid gear; and
   the wave generator as set forth in claim 1.

3. The strain wave gearing according to claim 2,
   wherein
   the rigid gear is an internally toothed gear;
   the flexible gear is an externally toothed gear disposed coaxially inside the rigid gear;
   the wave generator is accommodated inside the flexible gear;
   the rigid plug has a non-circular outer peripheral surface; and the non-circular outer peripheral surface is an outer peripheral surface contoured to have an ellipsoidal shape, and wherein the gap securing member includes first to fourth gap securing members, the first to fourth gap securing member being attached to an outer peripheral edge part of the rigid plug;

the first and second gap securing members are attached at angular positions that are symmetrical with respect to a major axis of the ellipsoidal shape and are within less than 45 degrees from the major axis; and the third and fourth gap securing members are attached at angular positions that are symmetrical with respect to the major axis and are within less than 45 degrees from the major axis, the angular positions of the third and fourth gap members being symmetrical with those of the first and second gap securing members with respect to the minor axis of the ellipsoidal shape.

4. A wave generator of a strain wave gearing, the wave generator comprising:

a rigid plug having a non-circular outer peripheral surface or a non-circular inner peripheral surface;

a wave bearing capable of being flexed radially, the wave bearing being mounted to the non-circular outer peripheral surface or the non-circular inner peripheral surface and being flexed into a non-circular shape; and a gap securing member that rotates integrally with the rigid plug, wherein the wave bearing comprises:

an inner race-side raceway surface and an outer race-side raceway surface that are flexed into a non-circular shape by the rigid plug; and a plurality of rolling elements inserted between the inner race-side raceway surface and the outer race-side raceway surface, part of the rolling elements being in a loose state and the remaining rolling elements being in a tight state; and wherein, where one pair of adjacent rolling elements among the rolling elements, are referred to as a first rolling element and a second rolling element, the first rolling element being in the loose state and the second rolling element being in the tight state, the gap securing member is a member for applying a braking force to the first rolling element against an orbital motion thereof in a direction toward the second rolling element, to secure a gap between the first rolling element and the second rolling element, wherein the rigid plug has a non-circular outer peripheral surface; and the non-circular outer peripheral surface is an outer peripheral surface contoured to have an ellipsoidal shape, and wherein the gap securing member includes first to fourth gap securing members, the first to fourth gap securing member being attached to an outer peripheral edge part of the rigid plug;

the first and second gap securing members are attached at angular positions that are symmetrical with respect to a major axis of the ellipsoidal shape and are within less than 45 degrees from the major axis; and the third and fourth gap securing members are attached at angular positions that are symmetrical with respect to the major axis and are within less than 45 degrees from the major axis, the angular positions of the third and fourth gap members being symmetrical with those of the first and second gap securing members with respect to the minor axis of the ellipsoidal shape.

5. A strain wave gearing comprising:

a rigid gear;

a flexible gear capable of meshing with the rigid gear; and the wave generator as set forth in claim 4.

6. A wave generator of a strain wave gearing, the wave generator comprising:

a rigid plug having a non-circular outer peripheral surface or a non-circular inner peripheral surface;

a wave bearing capable of being flexed radially, the wave bearing being mounted to the non-circular outer peripheral surface or the non-circular inner peripheral surface and being flexed into a non-circular shape; and a gap securing member that rotates integrally with the rigid plug, the gap securing member being attached to an outer peripheral edge portion of the rigid plug, wherein the wave bearing comprises:

an inner race-side raceway surface and an outer race-side raceway surface that are flexed into a non-circular shape by the rigid plug; and a plurality of rolling elements inserted between the inner race-side raceway surface and the outer race-side raceway surface, part of the rolling elements being in a loose state and the remaining rolling elements being in a tight state, and wherein, where one pair of adjacent rolling elements among the rolling elements, are referred to as a first rolling element and a second rolling element, the first rolling element being in the loose state and the second rolling element being in the tight state, the gap securing member is a member for applying a braking force to the first rolling element against an orbital motion thereof in a direction toward the second rolling element, to secure a gap between the first rolling element and the second rolling element and, wherein the gap securing member is an elastic member that is disposed in a state capable of coming in contact with the rolling elements from a lateral direction along a center axis line of the wave bearing and applies an elastic force as the braking force.

7. The wave generator of the strain wave gearing according to claim 6, wherein the elastic member is capable of being repeatedly and elastically deformed between a projecting position and a retreat position, the projecting position being at which the elastic member enters between the first rolling element and the second rolling element and the retreat position being at which the elastic member is pushed out laterally from the projecting position along the direction of the center axis line, and the elastic member rotates integrally with the rigid plug while getting over side surface portions of the respective rolling elements subjected to repeated elastic deformations between the projecting position and the retreat position.

8. The wave generator of the strain wave gearing according to claim 6,
wherein
the rigid plug has a non-circular outer peripheral surface; and
the non-circular outer peripheral surface is an outer peripheral surface contoured to have an ellipsoidal shape, and
wherein
the gap securing member includes first to fourth gap securing members, the first to fourth gap securing member being attached to an outer peripheral edge part of the rigid plug;
the first and second gap securing members are attached at angular positions that are symmetrical with respect to a major axis of the ellipsoidal shape and are within less than 45 degrees from the major axis; and
the third and fourth gap securing members are attached at angular positions that are symmetrical with respect to the major axis and are within less than 45 degrees from the major axis, the angular positions of the third and fourth gap members being symmetrical with those of the first and second gap securing members with respect to the minor axis of the ellipsoidal shape.

9. A strain wave gearing comprising:
a rigid gear;
a flexible gear capable of meshing with the rigid gear; and
the wave generator as set forth in claim 6.

10. The strain wave gearing according to claim 9,
wherein
the rigid gear is an internally toothed gear;
the flexible gear is an externally toothed gear disposed coaxially inside the rigid gear;
the wave generator is accommodated inside the flexible gear;
the rigid plug has a non-circular outer peripheral surface; and
the non-circular outer peripheral surface is an outer peripheral surface contoured to have an ellipsoidal shape, and
wherein
the gap securing member includes first to fourth gap securing members, the first to fourth gap securing member being attached to an outer peripheral edge part of the rigid plug;
the first and second gap securing members are attached at angular positions that are symmetrical with respect to a major axis of the ellipsoidal shape and are within less than 45 degrees from the major axis; and
the third and fourth gap securing members are attached at angular positions that are symmetrical with respect to the major axis and are within less than 45 degrees from the major axis, the angular positions of the third and fourth gap members being symmetrical with those of the first and second gap securing members with respect to the minor axis of the ellipsoidal shape.

* * * * *